2 Sheets—Sheet 1.
M. N. WARD.
CULTIVATOR, WEEDER AND MARKER.
No. 194,504. Patented Aug. 21, 1877.
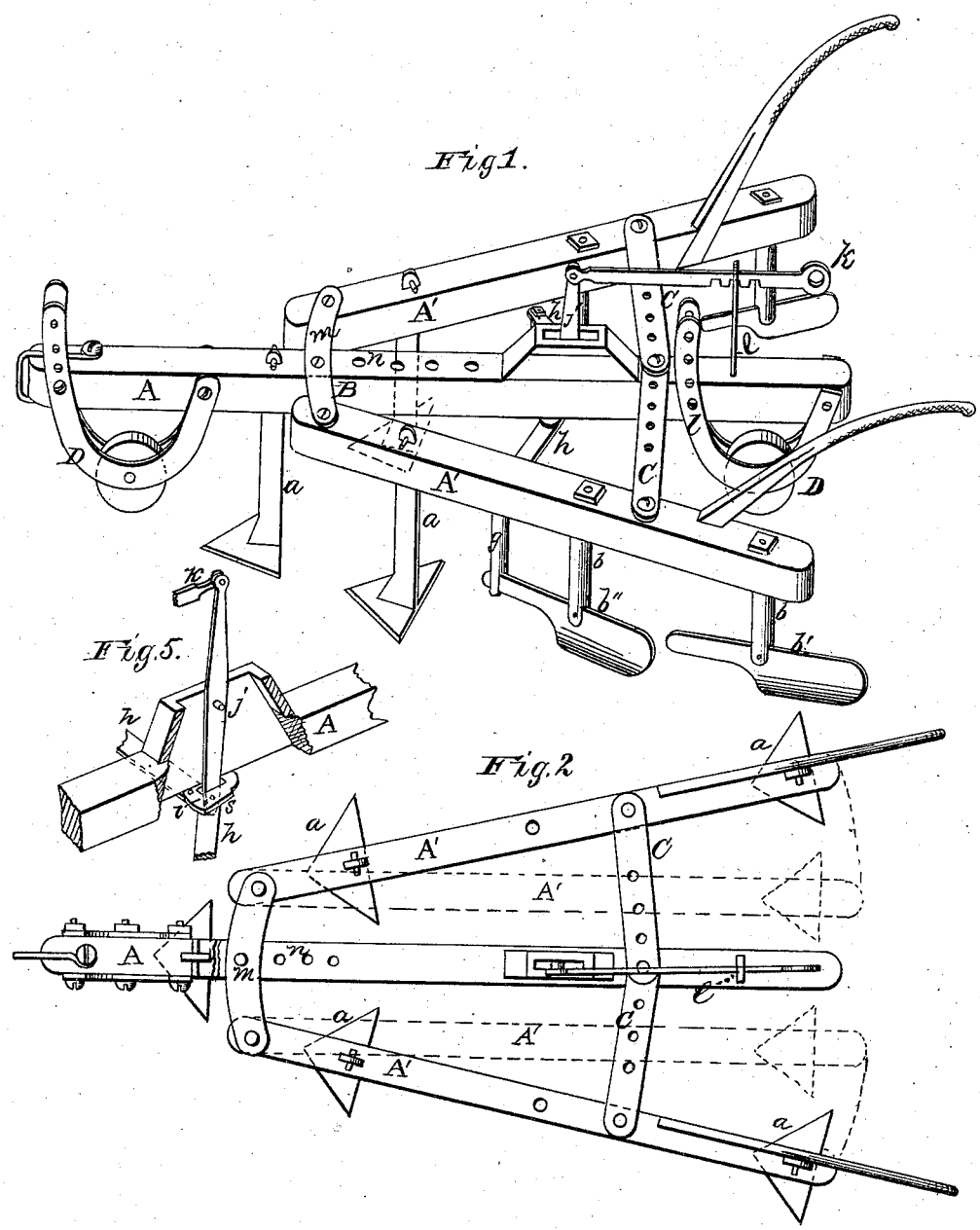
WITNESSES
INVENTOR
Moses N. Ward
by L. Deane.
ATTORNEY 2 Sheets—Sheet 2.
M. N. WARD.
CULTIVATOR, WEEDER AND MARKER.
No. 194,504. Patented Aug. 21, 1877.
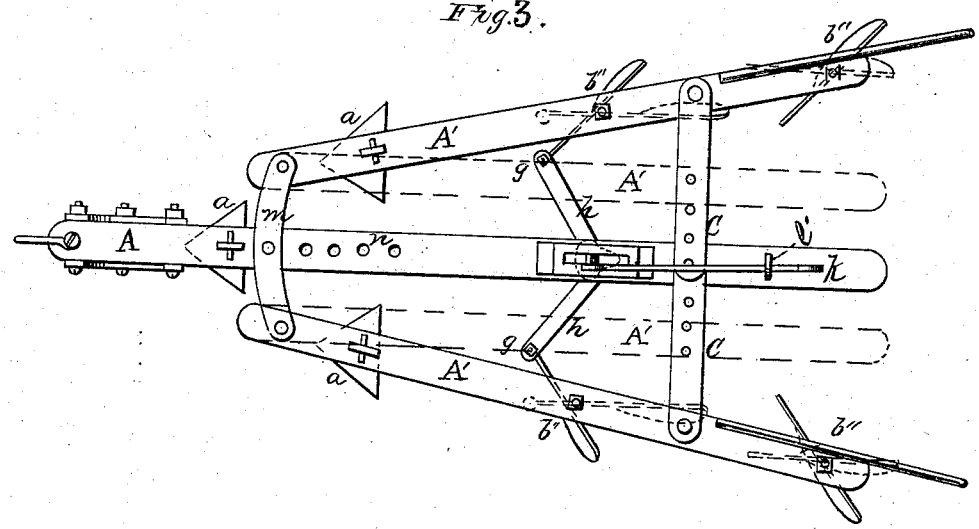
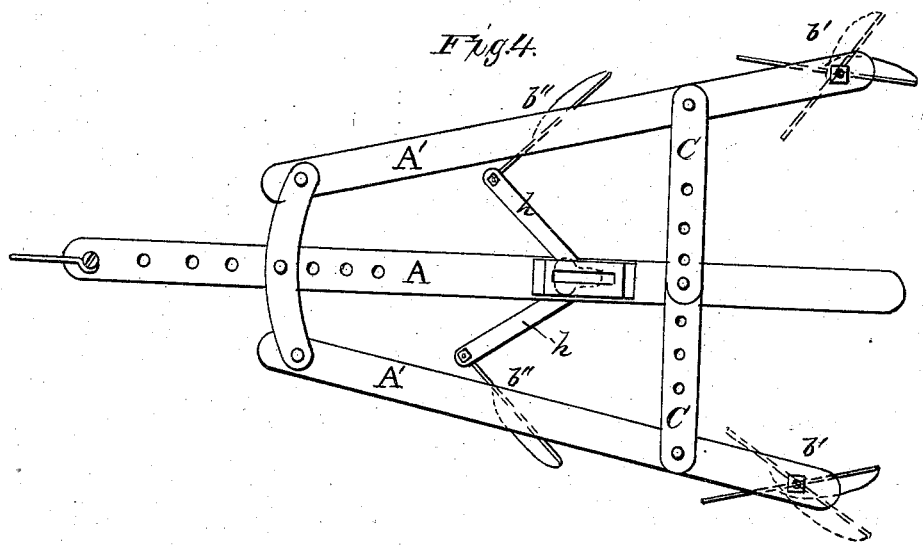
WITNESSES
INVENTOR
M. N. Ward.
by L. Deane.
ATTORNEY

UNITED STATES PATENT OFFICE.

MOSES N. WARD, OF CEDAR RAPIDS, IOWA, ASSIGNOR OF ONE-HALF HIS RIGHT TO D. J. BUCKLEY.

IMPROVEMENT IN CULTIVATOR, WEEDER, AND MARKER.

Specification forming part of Letters Patent No. 194,504, dated August 21, 1877; application filed July 11, 1877.

*To all whom it may concern:*

Be it known that I, MOSES N. WARD, of Cedar Rapids, in the county of Linn and State of Iowa, have invented a new, useful, and Improved Sod-Cutter, Weeder, Cultivator, and Marker, of which the following is a specification:

The object of my invention is to construct an implement which shall combine at once, with but little change in its component parts, the several articles of sod-cutter, weeder, cultivator, and marker, each one being complete in itself, and well adapted for the purpose assigned to it.

In the accompanying sheets of drawings, Figure 1 represents a side perspective view of the implement as adjusted for a weeder. Fig. 2 is a plan view of it arranged for cutting sod. Fig. 3 is a plan view of the weeder, showing by the dotted lines how the body of the implement may be expanded or decreased in width, and how the hoes may be adjusted to deposit the soil in any manner required. Fig. 4 represents a plan view of the marker, and, by the addition of dotted lines, shows the cultivator; and Fig. 5 is a sectional view of the device for changing the throw of the hoes.

Similar letters of reference indicate corresponding parts.

A A' A' is the frame of the implement, consisting of a central beam and two shorter beams, attached thereto in a well-known form by means of straps B and spread-irons C. To each end of the central beam A are attached gage-wheels D D, so constructed as to be adjusted to any desired point for governing the depth of the teeth in the soil. These may be caused to plow deep at one end of the implement and shallow at the other by raising one wheel and depressing the other, as required.

The frame A A' A' is provided with holes, into which are secured, by means of pins, keys, nuts, or other devices, the double cutting-teeth *a a a* and the hoe-teeth *b′ b′ b″ b″*. The standards of the teeth *a a a* are sharpened on their anterior edges to act as a colter in splitting sod, and terminate in a triangular horizontal plate, similarly sharpened, for the purpose of severing the sod from the ground, and also for cutting off and destroying weeds, when used as a weeder.

The hoes *b′ b′ b″ b″* are oblong blades, tapered at their forward extremities, and so connected to the standards *b* as to be on a plane with them, while the edges of the blades are at right angles therewith. The lower and cutting edge of the hoe-blade is slightly curved outwardly, and acts as a share in cutting weeds and stirring the soil.

The forward ends of hoes *b″ b″* are provided with perpendicular arms *g g*, Figs. 1 and 3, to which are attached the connecting-straps *h h*, Figs. 1, 3, and 5. These, uniting with the connecting-plate *i* under the central beam, are shifted by the lever *j*, controlled by shifter *k*. The shifter has notches in its under edge, and these, catching in the upright *l*, through which the shifter passes, retain it in any desired place. The effect of such shifting is to throw outwardly or inwardly the forward ends of hoes *b″ b″*, as will be seen by a comparison of its relative positions in Fig. 3, reference being had to the dotted lines.

The arms *g* may be attached to the rear hoes, and connecting straps and plate, as above described, may be used. By introducing a connecting-rod from one plate to the other, a corresponding movement will be imparted simultaneously to all the hoes, which movement is regulated by shifter *k*.

When in use as a sod-cutter the hoes *b′ b′ b″ b″* are removed by loosening the standards from frame A' A' and withdrawing the pin *s* in lever *j*, Fig. 5, when the whole will be free, and is easily detached. The side beams are then thrown back on the central beam, as shown in Fig. 2, by changing bolt *m* in holes *n*. The spread-irons C are correspondingly changed to the extra hole provided for that purpose in the rear end of the central beam. If it is desired to cut four strips of sod instead of two, extra cutters are introduced into the rear holes in beams A' A', as fully illustrated in Fig. 2. The elongation given to the implement, as above described, gives perfect steadiness and greater ease of draft by preserving an equal distance between the cutters, and the choking by weeds and other substances which would occur in the first three cutters from their proximity, if left in the original position, is, by this change, entirely prevented.

When used as a weeder, the frame is left in its normal position, Fig. 1, and three sod-cutters and four hoes are employed, the sod-cutters effectually cutting down and destroying all weeds, and the hoes covering them up. The more completely to effect this result the implement may be reduced in width, as indicated by the broken lines, Fig. 3, where the various positions in which the hoes may be placed are also shown.

The arrangement of the hoes for a cultivator is illustrated by the dotted lines in Fig. 4. The sod-cutters are dispensed with, and the two front hoes are brought near together by being placed in the extreme front holes in frame A' A'. The central beam is slipped forward sufficiently to allow the shifting device to work, and the cultivator is then ready for use. The rear hoes can be quickly adjusted to any pitch by loosening the nuts securing them to the frame. When it is not designed to throw the soil around the hills these hoes may be left in the position shown by the heavy lines. By a proper arrangement of the hoes the implement may be also used as a coverer.

Fig. 4, as a marker, needs little explanation, as the disposition of the parts is quite apparent. All the teeth except the rear ones being removed, and these set in the position therein indicated, the marker is ready for use.

Having thus described my invention, what I claim as new, and desire to secure by Letters Patent, is—

1. In combination with the beam A, having the shorter and side beams A' A' connected thereto, as shown, the marking-hoes $b'$ adapted to be set at any desired angle horizontally on standards $b$, substantially as described.

2. In a cultivator, the hoes $b''$, adjustable horizontally by means of beams A' and spread-irons C, and also on the standards $b$ by means of arms $g$, straps $h$, and lever $j$, substantially as set forth.

3. In the within-described device, the combination of the side beams A' with main beam A by means of strap B, adjustable lengthwise on said beam, and, by means of spread-irons C, adjustable parallel or at an angle therewith, substantially as described.

4. In combination with the frame A B A A, constructed and adapted to operate as described, the triangular sod-cutter $a\ a\ a$, and hoes $b''\ b''$ and $b'\ b'$, forming thereby a weeding device, substantially as herein set forth.

In testimony that I claim the foregoing as my invention, witness my hand this 27th day of June, A. D. 1877.

MOSES N. WARD.

Witnesses:
J. M. ST. JOHN,
R. H. GILMORE.